May 10, 1960          E. MAZUR          2,935,893
STEERING GEAR, PARTICULARLY FOR MOTOR VEHICLES
Filed June 19, 1957
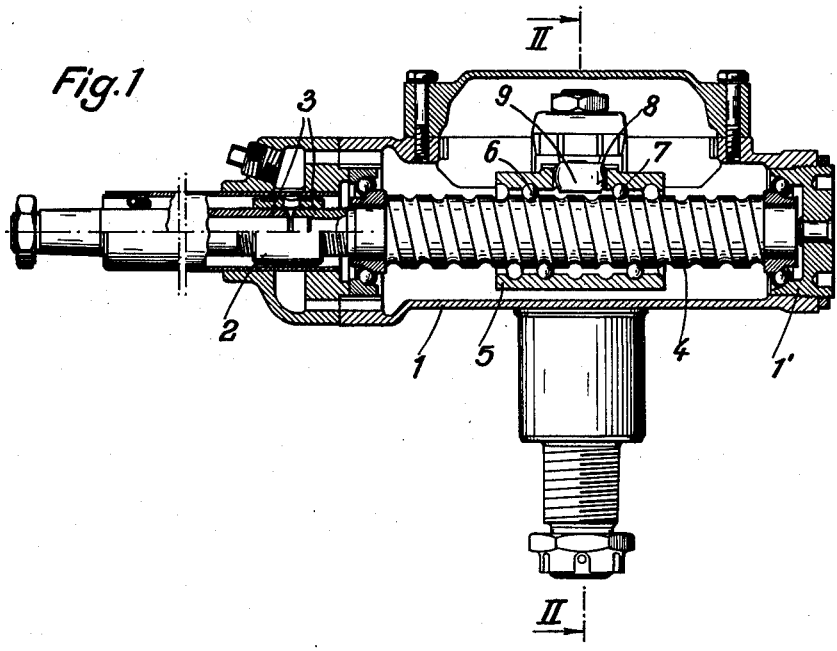
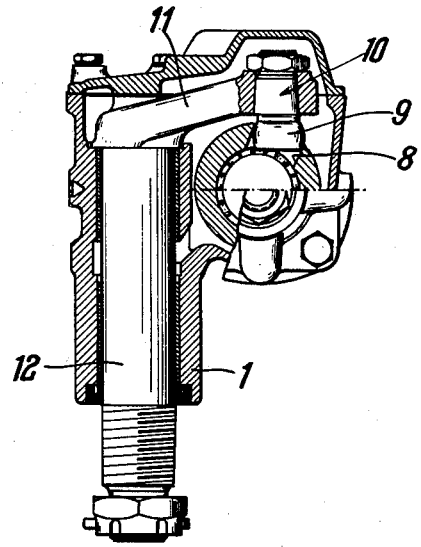
Inventor:
Erwin Mazur

United States Patent Office 2,935,893
Patented May 10, 1960

2,935,893

STEERING GEAR, PARTICULARLY FOR MOTOR VEHICLES

Erwin Mazur, Edingen (Neckar), Germany, assignor to Fulminawerk K.G. Franz Mueller, Mannheim, Friedrichsfeld, Germany Application June 19, 1957, Serial No. 666,587

Claims priority, application Germany June 25, 1956

2 Claims. (Cl. 74—499)

This invention relates to a steering gear, particularly for motor vehicles, comprising a shaft engaging nut which is guided solely by a steering shaft, and wherein the axial steering movement of said nut is transmitted to the rocker lever through a pin.

It is known in the art to arrange ball trains between nut and shaft in order to achieve an easy movement of the gear. Ball trains, however, involve a larger external diameter of the shaft engaging nut. Therefore, fairly large tilting forces cannot be avoided during transmission of the force, not even by the device of a semispherical shape of the transmission pin to be located very closely to the shaft engaging nut.

The object of the invention is to reduce the tilting forces acting on the nut, despite the use of ball trains, and at the same time to simplify the construction.

An essential feature of the invention is the arrangement of two ball trains, separated from each other and moving in the shaft thread and in the female thread, wherein the shaft engaging nut bears against the shaft by means of these ball trains, and wherein said nut is provided with a radial recess, through which recess engages the spherically shaped and preferably flattened end portion of the pin which is rigidly secured to the rocker lever. By the use of two ball trains separated from each other, in conjunction with a pin seizing the shaft engaging nut at a spot between the ball trains, a favourable increase of effectiveness is achieved in such a way, that the shaft engaging nut is supported concentrically, with respect to the shaft, on the one hand and that the nut receives slight tilting forces only on the other hand.

Further essential features of the invention will be understood from the following description.

A steering gear according to the invention is shown, by way of example in the drawing, wherein—

Fig. 1 shows the steering gear in a longitudinal section, cut by a plane parallel to the rocker shaft and, Fig. 2 shows a cross section along line II—II of Fig. 1.

The steering shaft 3, preferably constructed of two parts, and assembled by tooth gearing and a nut 2, is adjustably supported in the steering gear casing 1 by means of a threaded ball bearing race 1'. On the worm 4, carrying the thread, the shaft engaging nut 5, equipped with a matching thread, is guided along axially. The shaft engaging nut 5 bears against the shaft by means of two ball trains 6 and 7 circulating in separate paths. The by-pass members, known per se, are not shown. In the space between the two ball trains 6 and 7 the shaft engaging nut has a radial cylindrical bore 8, into which engages the spherically shaped and flattened end portion 9 of a pin 10, which is secured rigidly by means of a taper fit and screw arrangement to the end portion of a rocker lever 11. The rocker lever is designed by the known method and assembled to the rocker shaft 12 which is supported in the steering gear casing 1.

Through the fact that the shaft engaging nut bears at either end, by means of a ball train, against the shaft, a very exact concentric guiding performance is achieved between shaft engaging nut and shaft. As the point of application of the pin 10 to the shaft engaging nut 5 moves as closely as possible towards the shaft, only small tilting forces will act on the shaft engaging nut during the transmission of force. Therefore, a long operational life of the gear is obtained by the invention, as well as a uniform running without jam.

I claim:

1. In a worm and nut steering gear having a housing, a worm member supported for rotation in said housing, a rotatable steering shaft secured to said worm member for rotating it, an external helical groove on said worm member, a cylindrical nut member supported for rotation and axial movement with respect to said worm member, an internal helical groove in said nut member opposed to the helical groove of said worm member, a pair of separate ball trains adapted for movement between the helical grooves of said worm member and said nut member at each end of said nut member whereby rotational movement of said worm member imparts translatory movement to said nut member, a radial cylindrical bore extending through a wall of said nut member between the paths of said pair of ball trains, rocker arm means pivotally secured to said housing, a spherically surfaced pin secured to said rocker arm means extending through said radial cylindrical bore for movement by said bore, whereby translatory motion of said nut member produces pivotal motion of said rocker arm means.

2. A worm and nut steering gear comprising a housing, a rotatable steering shaft supported in said housing, an externally helically grooved worm member rotatably supported in said housing, an internally helically grooved nut member of cylindrical shape axially and rotatably movable mounted about said worm member, a pair of separate ball trains moving in separated paths engaging said worm member and said nut member whereby rotary movement of said worm member imparts translatory movement to said nut member when rotational movement of said nut member is restricted, a radial cylindrical bore through a wall of said nut member between each of said ball trains, adapted to receive a pin, rocker arm means pivotally secured to said housing, a truncated spherical projection pin extending through said radial bore to limit rotational movement of said nut member between specific limits, whereby translatory motion of said nut member imparts pivotal motion to said rocker arm means and said projection pin.

References Cited in the file of this patent

UNITED STATES PATENTS

| | | |
|---|---|---|
| 2,267,524 | Hawkins | Dec. 23, 1941 |
| 2,322,000 | Douglas | June 15, 1943 |
| 2,327,013 | Briggs et al. | Aug. 17, 1943 |
| 2,654,265 | Nallinger | Oct. 6, 1953 |
| 2,780,943 | Stump | Feb. 12, 1957 |

FOREIGN PATENTS

| | | |
|---|---|---|
| 551,496 | Great Britain | Feb. 25, 1943 |